United States Patent [19]

Sykes et al.

[11] E Patent Number: Re. 32,014

[45] Reissued Date of Patent: Oct. 29, 1985

[54] PROCESS FOR EXPANDING TOBACCO

[75] Inventors: Larry M. Sykes, Midlothian; Ray G. Snow, Richmond; Roger Z. de la Burde, Powhatan; Patrick E. Aument, Richmond, all of Va.

[73] Assignee: Philip Morris, Inc., New York, N.Y.

[21] Appl. No.: 626,190

[22] Filed: Jun. 28, 1984

Related U.S. Patent Documents

Reissue of:

[64] Patent No.: 4,336,814
Issued: Jun. 29, 1982
Appl. No.: 72,647
Filed: Sep. 5, 1979

U.S. Applications:

[63] Continuation of Ser. No. 822,793, Aug. 8, 1977, abandoned.

[51] Int. Cl.[4] ..... A24B 3/18

[52] U.S. Cl. ..... 131/291; 131/294; 131/295; 131/296; 131/900

[58] Field of Search ..... 131/296, 291, 295, 294, 131/900

[56] References Cited

U.S. PATENT DOCUMENTS

| | | | |
|---|---|---|---|
| Re. 30,683 | 8/1981 | Fredrickson | 139/296 |
| 3,524,452 | 8/1970 | Moser | 131/296 |
| 4,340,073 | 7/1982 | de la Burde | 131/241 |

FOREIGN PATENT DOCUMENTS

| | | | |
|---|---|---|---|
| 971067 | 7/1975 | Canada | 131/87 |
| 1444309 | 7/1976 | United Kingdom | 131/296 |
| 1484536 | 9/1977 | United Kingdom | 131/296 |

*Primary Examiner*—V. Millin

[57] ABSTRACT

This invention relates broadly to an improved process for expanding tobacco and involves certain modifications of the basic process for expanding tobacco comprising the steps of (1) contacting the tobacco with liquid carbon dioxide to impregnate the tobacco with the liquid carbon dioxide, (2) subjecting the liquid carbon dioxide-impregnated tobacco to conditions such that the liquid carbon dioxide is converted to solid carbon dioxide and (3) thereafter subjecting the solid carbon dioxide-containing tobacco to conditions whereby the solid carbon dioxide is vaporized to cause expansion of the tobacco. The present invention pertains, in one embodiment, to an improvement in the basic process which involves controlling the moisture content of the tobacco which is employed in the first step of the basic process. A second embodiment of the present invention involves draining off excess liquid carbon dioxide, under controlled conditions, after the first step of the basic process and prior to the second step of the basic process. The present invention pertains, in a third embodiment, to an improvement which involves controlling the output moisture of the product which is recovered from the third step of the basic process. The present invention further relates to various combinations of the three embodiments set forth above and to an overall process which employs all three embodiments in a manner which permits exceptionally advantageous results.

12 Claims, No Drawings

PROCESS FOR EXPANDING TOBACCO

Matter enclosed in heavy brackets [ ] appears in the original patent but forms no part of this reissue specification; matter printed in italics indicates the additions made by reissue.

This is a continuation of application Ser. No. 822,793, filed Aug. 8, 1977 now abandoned.

BACKGROUND OF THE INVENTION

Various processes have been proposed for expanding tobacco. For example, tobacco has been contacted with a gas under somewhat greater than atmospheric pressure, followed by a release of the pressure, whereby the tobacco cells are expanded to increase the volume of the treated tobacco. Other methods which have been employed or suggested have included the treatment of tobacco with various liquids, such as water or relatively volatile organic liquids, to impregnate the tobacco with the same, after which the liquids are driven off to expand the tobacco. Additional methods which have been suggested have included the treatment of tobacco with solid materials which, when heated, decompose to produce gases which serve to expand the tobacco. Other methods include the treatment of tobacco with gas-containing liquids, such as carbon dioxide-containing water, under pressure to incorporate the gas in the tobacco and when the tobacco impregnated therewith is heated or the pressure thereon is reduced to thereby expand the tobacco. Additional techniques have been developed for expanding tobacco which involve the treatment of tobacco with gases which react to form solid chemical reaction products within the tobacco, which solid reaction products may then decompose by heat to produce gases within the tobacco which cause expansion of the tobacco upon their release. More specifically:

A patent to Wilford J. Hawkins, U.S. Pat. No. 1,789,435, granted in 1931, describes a method and apparatus for expanding the volume of tobacco in order to make up the loss of volume caused in curing tobacco leaf. To accomplish this object, the cured and conditioned tobacco is contacted with a gas, which may be air, carbon dioxide or steam under about 20 pounds of pressure and the pressure is then relieved, whereby the tobacco tends to expand. The patent states that the volume of the tobacco may, by that process, be increased to the extent of about 5–15%.

An alien property custodian document No. 304,214 to Joachim Bohme, dated 1943, indicates that tobacco can be expanded using a high-frequency generator but that there are limitations to the degree of expansion which can be achieved without affecting the quality of the tobacco.

A patent to Frank J. Sowa, U.S. Pat. No. 2,596,183, granted in 1952, sets forth a method for increasing the volume of shredded tobacco by adding additional water to the tobacco to cause the tobacco to swell and thereafter heating the moisture containing tobacco, whereby the moisture evaporates and the resulting moisture vapor causes expansion of the tobacco.

A series of patents to Roger Z. de la Burde, U.S. Pat. Nos. 3,409,022, 3,409,023, 3,409,027 and 3,409,028, granted in 1968, relate to various processes for enhancing the utility of tobacco stems for use in smoking products by subjecting the stems to expansion operations utilizing various types of heat treatment or microwave energy.

A patent to John D. Hind, U.S. Pat. No. 3,425,425, granted in 1969, which is assigned to the same assignee as the assignee of the present invention, relates to the use of carbohydrates to improve the puffing of tobacco stems. In that process, tobacco stems are soaked in an aqueous solution of carbohydrates and then heated to puff the stems. The carbohydrate solution may also contain organic acids and/or certain salts which are used to improve the flavor and smoking qualities of the stems.

A publication in the "Tobacco Reporter" of November 1969 by P. S. Meyer describes and summarizes tobacco puffing or expansion procedures or investigations for expanding and manipulating tobacco for purposes of reducing costs and also as the means for reducing the "tar" content by reduction in the delivery of smoke. Mention is made in this publication of puffing tobacco by different procedures including the use of halogenated hydrocarbons, low pressure or vacuum operation, or high pressure steam treatment that causes leaf expansion from inside the cell when outside pressure is suddenly released. Mention is also made in this publication of freeze-drying tobacco which can also be employed to obtain an increase in volume.

Since the above-mentioned "Tobacco Reporter" article was published, a number of tobacco expansion techniques, including some of the techniques described in the article, have been described in patents and/or published patent applications. For example, U.S. Pat. No. 3,524,452 to Glenn P. Moser et al and U.S. Pat. No. 3,524,451 to James D. Frederickson, both issued in 1970, relate to the expansion of tobacco using a volatile organic liquid, such as a halogenated hydrocarbon.

U.S. Pat. No. 3,734,104 to William M. Buchanan et al, which is assigned to the same assignee as the assignee of the present invention, issued in 1973, relates to a particular process for the expansion of tobacco stems.

U.S. Pat. No. 3,710,802 to William H. Johnson, issued in 1973 and British Specification No. 1,293,735 to American Brands Inc., published in 1972, both relate to freeze-drying methods for expanding tobacco.

South African applications 70/8291 and 70/8292 to R. J. Reynolds Tobacco Company, both filed in 1970, relate to tobacco expansion employing chemical compounds which decompose to form a gas or with inert solutions of a gas under pressure to maintain the gas in solution until it impregnates the tobacco.

A patent to Robert G. Armstrong, U.S. Pat. No. 3,771,533, issued in 1973, which is assigned to the same assignee as the assignee of the present invention, involves a treatment of tobacco with carbon dioxide and ammonia gases, whereby the tobacco is saturated with these gases and ammonium carbonate is formed in situ. The ammonium carbonate is thereafter decomposed by heat to release the gases within the tobacco cells and to cause expansion of the tobacco.

Despite all of the above-described advances in the art, no completely satisfactory process has been found. The difficulty with the various earlier suggestions for expanding tobacco is that, in many cases, the volume is only slightly or at best only moderately increased. For example, freeze-drying operations have the disadvantages of requiring elaborate and expensive equipment and very substantial operating costs. With respect to the teaching of using heat energy, infrared or radiant microwave energy to expand tobacco stems, the difficulty is that while stems respond to these heating procedures, tobacco leaf has not generally been found to respond effectively to this type of process.

The use of special expanding agents, for example, halogenated hydrocarbons, such as are mentioned in the Meyer publication for expanding tobacco, is also not completely satisfactory because these substances are generally required to volatilize or otherwise be removed after the tobacco has been expanded. Furthermore, the introduction, in considerable concentration, of materials which are foreign to tobacco presents the problem of removing the expansion agent after the treatment has been completed in order to avoid affecting aroma and other properties of the smoke due to extraneous substances used or developed from the combustion of the treated tobacco.

The use of carbonated water has also not been found to be effective.

While the method employing ammonia and carbon dioxide gases is an improvement over the earlier described methods, it is not completely satisfactory under some circumstances, in that undesired deposition of salts can result during the process.

Carbon dioxide has been used in the food industry as a coolant and, more recently, has been suggested as an extractant for food flavors. It has also been described in German Offenlegungsschrift No. 2,142,205 (Anmeldetag; Aug. 23, 1971) for use, in either gaseous or liquid form, to extract aromatic materials from tobacco. However, there has been no suggestion, in connection with these uses, of the use of liquid carbon dioxide for the expansion of these materials.

A process employing liquid carbon dioxide has been found to overcome many of the disadvantages of the above-mentioned prior art processes. The expansion of tobacco, using liquid carbon dioxide is described in Belgium Pat. No. 821,568, which corresponds to U.S. Application Ser. No. 441,767 to de la Burde et al and assigned to the same assignee as the present application and in Belgium Pat. No. 825,133 to Airco, Inc. This process may be described as a process for expanding tobacco comprising the steps of (1) contacting the tobacco with liquid carbon dioxide to impregnate the tobacco with the liquid carbon dioxide, (2) subjecting the liqud carbon dioxide-impregnated tobacco to conditions such that the liquid carbon dioxide is converted to solid carbon dioxide and (3) thereafter subjecting the solid carbon dioxide-containing tobacco to conditions whereby the solid carbon dioxide is vaporized to cause expansion of the tobacco. The present invention involves modifications of the basic process which provide significant improvements thereto.

SUMMARY OF THE INVENTION

This invention relates broadly to an improved process for expanding tobacco and involves certain modifications of the basic process for expanding tobacco comprising the steps of (1) contacting the tobacco with liquid carbon dioxide to impregnate the tobacco with the liquid carbon dioxide, (2) subjecting the liquid carbon dioxide-impregnated tobacco to conditions such that the liquid carbon dioxide is converted to solid carbon dioxide and (3) thereafter subjecting the solid carbon dioxide-containing tobacco to conditions whereby the solid carbon dioxide is vaporized to cause expansion of the tobacco. The present invention pertains, in one embodiment, to an improvement in the basic process which involves controlling the moisture content of the tobacco which is employed in the first step of the basic process. A second embodiment of the present invention involves draining off excess liquid carbon dioxide, under controlled conditions, after the first step of the basic process and prior to the second step of the basic process. The present invention pertains, in a third embodiment, to an improvement which involves controlling the output moisture of the product which is recovered from the third step of the basic process. The present invention further relates to various combinations of the three embodiments set forth above and to an overall process which employs all three embodiments in a manner which permits exceptionally advantageous results.

DETAILED DESCRIPTION OF THE INVENTION

This invention relates broadly to improvements in the process for expanding tobacco which employs liquid carbon dioxide as the expansion agent. The invention, generally, relates broadly to a process for expanding tobacco employing a single agent which is a readily available, relatively inexpensive, non-combustible and exceptionally effective and more particularly to the production of an expanded tobacco product of substantially reduced density produced by impregnating tobacco under pressure with liquid carbon dioxide, converting the liquid carbon dioxide to solid carbon dioxide in situ, which may be accomplished by rapidly releasing the pressure, and thereafter causing the solid carbon dioxide to vaporize and expand the tobacco, which may be accomplished by subjecting the impregnated tobacco to heat, radiant energy or similar energy generating conditions which will cause the solid carbon dioxide which is in the tobacco to rapidly vaporize.

To carry out the process of the invention, one may treat either whole cured tobacco leaf, tobacco in cut or chopped form, or selected parts of tobacco such as tobacco stems or maybe reconstituted tobacco. In comminuted form, the tobacco to be impregnated may have a particle size of from about 20 to 100 mesh, but is preferably not less than about 30 mesh. The material to be treated may be in relatively dry form, or may contain the natural moisture content of tobacco or even more.

Generally, the tobacco to be treated will have at least about 8% moisture (by weight) and less than about 50% moisture. A specific improvement in the process, which is an embodiment of the present invention, involves the discovery that the moisture content of the tobacco which is employed in the first step of the process should have a value of from about 17% to about 25%, depending on the particular pressure used. As used herein, the tobacco moisture content may be termed "input moisture" or "input OV" and is approximately equivalent to oven volatiles (OV), since, generally, no more than about 0.9% by weight of tobacco weight is volatiles other than water. We have found that, unexpectedly, by utilizing an input OV in this range, the first step of the process may be more advantageously operated at pressures lower than were heretofore considered optimal. A detailed discussion of pressures employed in the first stage of the process is set forth later in this specification; however, with regard to this particular embodiment, we have found that the following input OV's are preferred for the following pressures:

at 300 psig an input OV of from about 18 to about 25% at 400 psig an input OV of from about 17 to about 25% at 450 psig an input OV of from about 17 to about 25% at 500 psig an input OV of from about 16 to about 23% at 625 psig an input OV of from about 14 to about 19% at 750 psig an input OV of from about 13 to about 18% at 850 psig an input OV of from about 12 to about 18%.

To raise the moisture content of a tobacco to the desired input moisture level, the tobacco may be sprayed with water, contacted with steam or the like until the desired level is reached, preferably by water spray. To lower the moisture content of tobacco to the desired level, the tobacco may be heated, preferably by indirect steam heat, until the desired level is reached.

We have found that this improvement in the basic process permits obtaining desired levels of expansion at lower pressures than were heretofore found to be needed to obtain such expansion. For example, prior to the present discovery, while a broad range of pressures was found workable, it was believed necessary to operate the process at a pressure of about 515 psia or above to obtain a product having a cylinder volume (CV) approaching a value of about 70 (which generally represents a level of expansion that is clearly commercially desirable). It has now been found, surprisingly, that a cylinder volume of 68 can be obtained at a pressure of 315 psia, by operating with an input OV of about 20% and an output OV of less than about 6%.

The terms "cylinder volume" and "corrected cylinder volume" are units for measuring the degree of expansion of tobacco. The term "oven-volatiles content" or "oven volatiles" is a unit for measuring moisture content (or percentage of moisture) in tobacco. As used throughout this application, the values employed, in connection with these terms, [as] *are* determined as follows:

Cylinder Volume (CV)

Tobacco filler weighing 10.000 g is placed in a 3.358-cm diameter cylinder and compressed by a 1875-g piston 3.335 cm in diameter for 5 minutes. The resulting volume of filler is reported as cylinder volume. This test is carried out at standard environmental conditions of 23.9° C. and 60% RH; conventionally unless otherwise stated, the sample is preconditioned in this environment for 18 hours.

Corrected Cylinder Volume (CCV)

The CV value may be adjusted to some specified oven-volatile content in order to facilitate comparisons.

$CCV = CV + F\ (OV - OV_s)$ where $OV_s$ is the specified OV and F is a correction factor (volume per %) predetermined for the particular type of tobacco filler being dealt with.

Oven-Volatiles Content (OV)

The sample of tobacco filler is weighed before and after exposure for 3 hours in a circulating air oven controlled at 100° C. The weight loss as percentage of initial weight is oven-volatiles content.

For expanded bright tobacco employed in the present application, the value of F in the calculation of CCV is 7.4.

The tobacco, at the desired input moisture level, will generally be placed in a pressure vessel in a manner whereby it can be suitably immersed or contacted by liquid carbon dioxide. For example, a wire cage or platform may be used.

The tobacco-containing pressure vessel may be purged with carbon dioxide gas, by vacuum or with another inert gas, the purging operation generally taking from about 1 to 4 minutes. The purging step may be eliminated without detriment to the final product. The benefits of purging are the removal of gases that could interfere with a carbon dioxide recovery process and to flush out of the tobacco any foreign gases which might interfere with full penetration of the liquid carbon dioxide.

The liquid carbon dioxide which is employed in the process of this invention may be obtained from a storage vessel where it will, generally, be maintained at a pressure of from about 250 to 305 psig. The liquid carbon dioxide may be introduced into the pressure vessel at 250 to 400 psig or over the range of 250 to 525 psig. At the time the liquid carbon dioxide is introduced into the pressure vessel, the interior of the vessel, including the tobacco to be treated, should preferably be at a pressure at least sufficient to maintain the carbon dioxide in a liquid state.

The liquid carbon dioxide is introduced into the vessel in a manner which permits it to completely contact the tobacco and sufficient liquid carbon dioxide should preferably be employed to completely saturate the tobacco. Generally, this will comprise using about 1 to 10 parts by weight of liquid carbon dioxide per part of tobacco. Excess liquid carbon dioxide will be wasteful but will work. The temperature of the liquid carbon dioxide should, preferably, not be permitted to exceed about 31° C., during this impregnation step.

The pressure during the contacting step involving the first embodiment of this invention is preferably maintained at a pressure of from about 250 to about 525 psig, employing heating of the vessel, using heating coils or the like, where needed.

The tobacco and liquid carbon dioxide may be maintained in contact under these conditions for a period of from about 0.1 to 30 minutes.

After the liquid carbon dioxide has been permitted to saturate the tobacco, generally for a total period of from about 0.1 to 30 minutes and preferably from about 0.2 to about 1 minute, any excess liquid carbon dioxide which may be present is drained out of the vessel, preferably while maintaining the conditions of temperature and pressure at the same levels as during the contacting step.

A specific improvement in the process which is a second embodiment of this invention involves the utilization of a post-drain period. This embodiment may be utilized in combination with the first embodiment described above in the preferred pressure range during the contacting step of from about 250 to about 525 psig; however, this embodiment may be utilized over a broader pressure range of from about 215 to about 950 psig, its benefits being greater at the lower portion of this pressure range. In accordance with the process after a soaking time of at least 0.1 minute and up to 30 minutes to achieve impregnation of the liquid carbon dioxide into the tobacco, the liquid is generally removed from the tobacco mass, for example, through an exit port at the bottom of the chamber, while maintaining the pressure in the vessel. We have found that unexpected advantages are obtained by utilizing a post-drain period of at least 2 minutes beyond the point where the continuous flow of liquid carbon dioxide draining from the vessel has stopped. Prior to the present invention, a method for controlling the process at this point involved observing the liquid carbon dioxide level through a sight glass attached to the impregnation vessel, as the liquid $CO_2$ was withdrawn and stopping the draining at a point when liquid was no longer observed, that is, when there was no longer a continuous flow of liquid $CO_2$. A brief check for additional liquid, immediately after stopping the draining was sometimes employed. In accordance with the present invention, a post-drain period, involving waiting for at least about two minutes, and preferably at least about three minutes, and thereafter draining the liquid for a second time, until continuous flow of liquid stops a second time, is employed. The second flow of liquid may, generally, last less than a minute. Such a post-drain period serves to insure that excess liquid is removed from the tobacco surfaces. The post draining step may be aided by a downward sweep of $CO_2$ or other gas through the mass. We have found that the post-drain period results in substantially complete drain-off and provides: (1) more complete recovery of $CO_2$ as liquid rather than as gas (which requires condensation in recovery steps), (2) the removal of liquid from the surface of the tobacco, which otherwise upon pressure reduction, has been found to be partially converted to solid on the tobacco surfaces, which solid binds the tobacco in clumps, making it hard to handle and required to be broken up attendant with formation of tobacco "fines," and (3) a reduction of the heat load on the expansion equipment by removing the necessity for vaporizing ineffective solid $CO_2$ from the surface.

The post-drain period should be at least about 2 minutes, but is preferably from about 2½ to about 6 minutes, longer times providing little additional advantage but being satisfactory, and depends on the configuration and size of the vessels, to a considerable extent.

After the impregnation, draining and post-draining, the gas pressure is reduced at a sufficiently rapid rate that at least a portion of the carbon dioxide within the tobacco is converted to solid.

The pressure in the vessel is released, by venting the gases in order to bring the contents of the vessel to atmospheric pressure. This venting generally takes from about 0.75 to 15 minutes, depending on the size of the vessel, but should preferably take no longer than 3 minutes, after which the temperature in the vessel will generally be from about −85° to −95° C. and the liquid carbon dioxide in the tobacco will be partially converted to solid carbon dioxide. The pressure need not be reduced to atmospheric, but need only be reduced below about 60 psig. Obviously, this is not as preferable from a commercial viewpoint as reducing the pressure to atmospheric.

The drain and post-drain should preferably be such that the tobacco contains from about 6 to about 25% by weight of solid $CO_2$ and most preferably from about 10 to about 20% by weight of solid $CO_2$.

After the carbon dioxide in the tobacco is converted to its solid form, the solid carbon dioxide-containing tobacco is then exposed to expansion conditions by subjecting the treated product to heat or the equivalent in order to vaporize and remove the solid carbon dioxide from the tobacco. This may comprise the use of hot surfaces, or a stream of hot air, a mixture of gas and steam, or exposure to other energy sources such as radiant microwave energy or infrared radiation. A convenient means of expanding the solid carbon dioxide-containing tobacco is to place it or to entrain it in a stream of heated gas, such as superheated steam or to place it in a turbulent air stream maintained, for example, at a temperature as low as about 100° C. and as high as about 370° C. and preferably at a temperature of from about 150° to about 260° C. for a period of about 0.2 to 10 seconds. The impregnated tobacco may also be heated by being placed on a moving belt and exposed to infrared heating, by exposure in a cyclone dryer, by contact in a dispersion dryer with superheated steam or a mixture of steam and air or the like. Any such contacting steps should not raise the temperature of the atmosphere with which the tobacco is in contact to above about 370° C. and should preferably be from at about 100° C. to about 300° C., most preferably 150° to 260° C. when conducted at atmospheric pressure.

As is well known in processing of any organic matter, overheating can cause damage, first to color, such as undue darkening, and finally, to the extent of charring. The necessary and sufficient temperature and exposure time for expansion without such damage is a function of these two variables as well as the state of subdivision of the tobacco. Thus, to avoid undesirable damage in the heating step, the impregnated tobacco should not be exposed to the higher temperature levels, e.g. 370° C., for longer than several tenths of a second.

One method for causing the expansion of the tobacco cells is to use the radiation methods described in either U.S. Pat. Nos. 3,409,022 or 3,409,027. Another method involves the use of a heat gun such as the Dayton heat gun or the equivalent, operating at an exit air temperature of 190°-344° C. for a period of about 0.2 second to 4 minutes, the shorter times, of course, being given for the higher temperatures. In this operation, the tobacco never attains a temperature above about 140° C. being cooled by the rapid evolution of gases. The presence of steam during heating assists in obtaining optimum results.

Another system is to use a dispersion dryer, for example, one that is supplied either with steam alone or in combination with air. An example of such a dryer is a Proctor & Schwartz PB dispersion dryer. The temperature in the dryer may range from about 121° to 371° C. with contact time in the dryer of about 4 minutes at the lowest temperature to about 0.1 to 0.2 second at the highest temperature. In general, a 0.1 to 0.2 second contact time is utilized when the hot gas temperature is 260°-315° C. or somewhat higher. As stated before, other known types of heating means may be used as long as they are capable of causing the impregnated tobacco to expand without excessive darkening. It should be noted, that where a high percentage of oxygen is present in the hot gases, it will contribute to darkening, so that if a hot-steam mixture is employed, a high proportion (e.g., over 80% volume) of steam is preferred. The presence of a steam atmosphere of 20% or more of the total hot gas composition aids in obtaining the best expansion.

A third embodiment of the present invention involves controlling the output or exit moisture of the product of the heating step, for the expansion of the tobacco, so that the output moisture is preferably no higher than 6% and most preferably no higher than 3.0%, determined as OV.

As set forth above, it is important that the product from the heating/expansion step have an exit OV content of not more than 6%. The result of this relatively dry condition is an optimum permanent expansion, after reordering to standard moisture conditions. Such exit OV can be achieved by the proper balance between feed rate of impregnated tobacco to the dryer and temperature of dryer gas, assuming a fixed gas flow; the flow rate is another variable to be considered. The exit OV can also be brought down to a desired level by further treatment of the product, as in a dryer.

After the tobacco has been recovered from the heating/expansion step at the desired exit OV, it is then, generally, equilibrated (reordered) at conditions which are well known in the trade. Reordering is preferably done at standard conditions, which generally involve maintaining the tobacco at a temperature of 23.9° C. and 60% RH (relative humidity) for at least 18 hours.

The present process may be conducted in various forms of apparatus, for example, such as are described in Belgian Pat. Nos. 821,568 and 825,133.

It is important that the apparatus in which the liquid carbon dioxide-containing tobacco is converted to solid carbon dioxide-containing tobacco is able to contain gases at the elevated pressures which may be employed, in some instances, as high as 1000 psig or more. This vessel is preferably employed for the initial contact of the liquid carbon dioxide with the tobacco. There may be numerous arrangements of the pressure vessel. However, there should preferably be a valved inlet from a source of liquid carbon dioxide and a valved outlet at the bottom of the vessel whereby liquid may be drained off; a second valved outlet near the top, for venting, may be added, and could be inserted as part of the inlet line, if desired, placed between the vessel and the inlet valve. A means of heating the vessel and/or the supply vessel, such as external heating coils, may be employed. Supporting the vessel on a load cell greatly simplifies measuring the carbon dioxide charge. A supplementary vessel similarly equipped with weighing means and heating coils is advantageous, though not essential, because it permits preheating a charge of liquid carbon dioxide from its usual low storage temperature of −20° F. (which may be about 215 psig). In operation, the filler may be placed in the main pressure vessel in a suitable holder such as a wire basket suspended above the bottom of the vessel. The closed vessel may then be purged with carbon dioxide gas and the outlets closed, then liquid carbon dioxide is introduced from storage, for example, at 250 psig, in an amount sufficient to cover all of the tobacco present in the vessel. The temperature is raised by the heating means, e.g., heating coils to bring the tobacco to the desired temperature, which should be less than 31° C. (the critical temperature of carbon dioxide) and this condition is preferably maintained for 1 to 20 minutes while impregnation takes place. Excess liquid carbon dioxide is then drained off by opening the lower outlet of the vessel to a suitable reservoir or the like disposal system, and when all excess liquid has been removed from the vessel, the vessel is vented to atmospheric pressure. The tobacco is then subjected to an operation to volatilize the solid carbon dioxide, preferably by removing the solid carbon dioxide-containing tobacco from the vessel and passing it through any of several rapid heating systems to achieve expansion. As indicated earlier in this specification, systems for this expansion process are most satisfactory which provide rapid, turbulent contact with the hot gas or vapor. With proper control of temperature and exposure time, the product may be recovered in the expanded state at the desired moisture content.

The overall process, apart from the specific improvements set forth in the present specification, may be generally in accordance with the teachings in copending U.S. patent application No. 441,767, *now U.S. Pat. No. 4,340,073*, or Belgian Pat. No. 821,568.

The following examples are illustrative.

EXAMPLE 1

One hundred pounds of bright tobacco particles of cigarette filler size having 20% OV content was placed in a wire basket in a pressure vessel. The vessel was closed except for a port for admission of $CO_2$ gas. The gas was introduced to a pressure of 400 psig and the port closed. The vessel was then filled with liquid $CO_2$ at 400 psig and −7° C. sufficient to cover the tobacco mass. The system was held at these conditions for 30 seconds, then a bottom port was opened to allow the liquid to be pumped out. The port was closed and after three minutes it was reopened to release the accumulated liquid. This port was closed and the vessel opened to the atmosphere through a valve at the top, so that the pressure was released in a period of 180 seconds. When the top was removed from the vessel and the basket weighed, it was found that 18.0 lb. of $CO_2$ was retained by the tobacco. The product was not difficult to separate and could be fed at a controlled rate to the next stage. A similar batch without the drain period retained 31.5 lb. of $CO_2$ and was badly clumped.

An eight-inch diameter vertical dryer supplied with 125 ft./sec. of 85% superheated steam in air at 249° C. was used for expansion. The product from $CO_2$ treatment was fed at 3.7 lb./min. to the dryer where contact with the steam was estimated to be three seconds. The product collected in a cyclone separator had OV content, when cool, of 1.8%. Its reordered cylinder volume, corrected to 11% OV, was 74.0 cc/10 g as compared with the original CV of 34.0 cc/10 g for the untreated bright filler at its standard moisture content of 12.5% OV.

EXAMPLE 2

One hundred-pound batches of bright tobacco similar to that used in the preceding example and having similar input moisture content were processed as before, with blowndown in 177–190 seconds, except for elimination of the 3-minute draining period and for variations in the expansion procedure and conditions. The result was varying exit OV content and product filling power, as measured by CCV. The results and conditions for these runs, in duplicate, are compared in Table 1. Expansion was by tower exposure, about 3 seconds, to 81 to 88% steam. It will be seen that optimum filling power is realized at low OV for product exiting from the expansion stage, and that OV of less than 6.0% is desirable and less than 2.5% is most desirable.

TABLE 1

| Feed to Tower lb./min. | Tower Temp. °C. | Exit OV, % | | CCV, cc/10 g | |
|---|---|---|---|---|---|
| 5.5 | 149 | 12.0, | 12.2 | 59.4, | 65.6 |
| 5.0 | 177 | 8.5, | 7.8 | 65.0, | 67.8 |
| 4.25 | 204 | 4.5, | 4.8 | 67.8, | 69.2 |
| 3.13 | 249 | 1.8, | 2.5 | 69.5, | 75.4 |

EXAMPLE 3

Bright tobacco weighing 100 lb. and having 20% OV was prepared for immersion as in Example 1. Liquid carbon dioxide was admitted to the chamber, previously pressurized to 300 psig, at the same pressure until the tobacco was covered, and held thus for 30 seconds; the temperature was about −16.7° C. The liquid was pumped off through a bottom valve and a five-minute sweep of $CO_2$ gas from top to bottom of the vessel helped remove undrained $CO_2$ liquid. The vessel was then vented to the atmosphere in 152 seconds and the chilled product was removed.

This product was not clumped; it was introduced into an expansion tower having 85% steam flow of 125 ft./sec. at 249° C., at a rate of about 4.3 lb./min. total weight. Exposure was estimated at 3 seconds. The product contained 2.1% OV and upon reordering to 12.0% OV it showed a cylinder volume, corrected to 11.0% OV, of 68.0 cc/10 g. The starting filler had CCV of 37.3 cc/10 g at 12.5% OV.

EXAMPLE 4

One hundred-pound lots of bright tobacco of varying OV content were treated by the process of Example 1 (impregnation, liquid removal, drain, pressure release, and expansion by tower exposure) with only the tower gas temperature varied from 232° to 254° C. to compensate for increasing OV levels of input. The exit OV of all samples was between 1.3% and 2.8% OV. After being reconditioned, all samples were checked for CV, corrected to 11.0% OV. The results shown in Table 2 indicate that a moisture (OV) needed to achieve the best expansion, in this series at least 68 cc/10 g CCV, is 17% minimum.

TABLE 2

Cylinder Volume vs. Input Moisture with 400 psig Impregnation

| Input OV % | | Output Filling Power: Reordered CV, cc/10 g | | Output Filling Power: CCV, 11% OV cc/10 g | |
|---|---|---|---|---|---|
| 10.1 | | 44.5 | | 50.6 | |
| 10.6 | | 52.5 | | 55.0 | |
| 10.9, | 10.9 | 47.9, | 48.5 | 53.1, | 52.6 |
| 11.7 | | 59.6 | | 62.3 | |
| 15.5 | | 60.7 | | 66.5 | |
| 16.0, | 16.0 | 59.6, | 60.4 | 64.6, | 67.0 |
| 17.1, | 17.0 | 61.0, | 62.2 | 69.1, | 69.0 |
| 17.4, | 17.5 | 62.2, | 58.6 | 68.7, | 67.9 |
| 17.7, | 17.9 | 68.7, | 64.6 | 72.9, | 68.2 |
| 18.0, | 18.4 | 62.0, | 67.1 | 70.9, | 72.5 |
| 19.0, | 19.1 | 60.9, | 63.2 | 68.3, | 70.1 |
| 18.0, | 18.3 | 69.2, | 60.8 | 74.4, | 68.1 |
| 19.4, | 19.5 | 60.9, | 56.9 | 72.6, | 69.4 |
| 19.7, | 20.6 | 63.0, | 68.9 | 73.8, | 73.4 |
| 21.9, | 21.9 | 68.2, | 71.4 | 73.0, | 76.5 |
| 23.0 | | 59.1 | | 68.6 | |
| 23.5, | 23.5 | 63.9, | 66.3 | 70.7, | 71.0 |
| 23.9, | 24.2 | 58.6, | 58.9 | 68.4, | 68.6 |

TABLE 2-continued

Cylinder Volume vs. Input Moisture with 400 psig Impregnation

| Input OV % | Output Filling Power: Reordered CV, cc/10 g | Output Filling Power: CCV, 11% OV cc/10 g |
|---|---|---|
| 25.7 | 58.6 | 68.4 |

EXAMPLE 5

Batches of bright tobacco filler were impregnated and subsequently expanded exactly as described in Example 1 except that the drain time (from closing to reopening of the port) was varied as shown in the tables. The first batches (Table 3) were 100-pound and had a depth in the impregnator of 36 inches; the second group (Table 4) weighed 185 pounds and had a depth of 60 inches. The OV at exit from the expansion tower was in the neighborhood of two percent in every run. The products were measured for cylinder volume and were also sieved for comparison of size reductions. The 3-minute purge was similar to a 3-minute drain time, except that $CO_2$ gas was blown down through the impregnated tobacco as a purge gas.

Tables 3 and 4 tabulate the results. Since a distribution approximating that of the control is desirable, and in particular a total of "smalls" and "fines" (S+F) no greater than about 2% is sought, it will be seen that the drain times of two minutes or longer gave the best results. There appeared to be little or no effect on corrected CV.

TABLE 3

Effect of Drain Time on Sieve Fractions with 100-Pound Batches

| Drain Time, Mins. | Sieve Fractions, %: Long | Med. | Short | Small | Fine | L + M | S + F | CCV cc/10 g at 11% OV |
|---|---|---|---|---|---|---|---|---|
| Unexpanded Control | 55.5 | 35.9 | 7.0 | 0.9 | 0.6 | 91.4 | 1.5 | — |
| 0 | 38.2 | 50.0 | 9.2 | 1.2 | 1.2 | 88.2 | 2.4 | 74.6 |
| 1 | 41.9 | 47.7 | 8.1 | 1.2 | 1.2 | 89.6 | 2.4 | 73.7 |
| 2 | 43.7 | 47.0 | 7.3 | 1.0 | 0.9 | 90.7 | 1.9 | 76.3 |
| 3 | 42.2 | 49.2 | 6.8 | 0.7 | 1.0 | 91.4 | 1.7 | 74.2 |
| 3-Minute Purge | 42.7 | 48.5 | 6.9 | 1.0 | 1.0 | 91.2 | 2.0 | 75.0 |

TABLE 4

Effect of Drain Time on Sieve Fractions with 185-Pound Batches

| Drain Time, Mins. | Sieve Fractions, %: Long | Med. | Short | Small | Fine | L + M | S + F | CCV cc/10 g |
|---|---|---|---|---|---|---|---|---|
| Control | 52.0 | 38.9 | 7.5 | 1.1 | 0.5 | 90.9 | 1.6 | — |
| 0 | 38.3 | 48.5 | 10.0 | 2.0 | 1.3 | 86.8 | 3.3 | 74.4 |
| 3 | 44.5 | 45.7 | 7.7 | 1.2 | 0.9 | 90.2 | 2.1 | 76.6 |
| 6 | 44.1 | 46.1 | 7.7 | 1.2 | 0.9 | 90.2 | 2.1 | 76.8 |

As employed in the above example, the various sieve fractions are defined as follows: Long = +10 (i.e. the particles are retained on a 10 mesh sieve); Medium = −10 to +20; Short = −20 to +30; Small = −30 to +50; and Fine = −50.

What is claimed is:

1. In the method of expanding tobacco which comprises the steps of (1) impregnating the tobacco with liquid carbon dioxide under conditions such that substantially all of the liquid carbon dioxide is maintained in liquid form so impregnate the tobacco with the liquid carbon dioxide, (2) subjecting the liquid carbon dioxide-impregnated tobacco to conditions such that the liquid carbon dioxide is converted to solid carbon dioxide and (3) thereafter subjecting the solid carbon dioxide-containing tobacco to conditions whereby the solid carbon dioxide is vaporized to cause expansion of the tobacco, the improvement which comprises: (i) utilizing as the tobacco which is employed in step (1) a tobacco which has an OV content of from about 17 to about 30%, (ii) conducting the impregnation step under pressure in the range of from about 250 psia to about 450 psia, and (iii) conducting the third step in such a manner that the moisture content of the expanded tobacco obtained from the third step is no higher than about 6%.

2. The method of expanding tobacco of claim 1, wherein the impregnation step is conducted at a pressure of from about 350 psia to about 450 psia and the tobacco which is employed in step (1) has an initial OV content of from about 17 to about 25%.

3. The method of expanding tobacco of claim 1 wherein the third step is conducted in such a manner that the moisture content of the expanded tobacco obtained from the third step is no higher than about 3%.

*4. In the method of expanding tobacco which comprises the steps of (1) contacting the tobacco with liquid carbon dioxide under conditions such that substantially all of the liquid carbon dioxide is maintained in liquid form and the tobacco is impregnated with liquid carbon dioxide, (2) subjecting the tobacco contacted with liquid carbon dioxide to conditions such that a portion of the carbon dioxide remaining in the tobacco is converted to a solid form, and (3) thereafter subjecting the tobacco to conditions such that the solid impregnant is converted to gaseous form and the tobacco is expanded, the improvement comprising:*

*(a) utilizing as the tobacco which is employed in step (1) a tobacco which has an OV content of from about 17% to about 30%;*

*(b) conducting the liquid contact step under pressure in the range of from about 250 psia to about 450 psia; and*

(c) conducting the expansion step in such a manner that the moisture content of the expanded tobacco is no higher than about 6%.

*5. The method of expanding tobacco of claim 4 wherein the liquid contacting step is conducted at a pressure of from about 350 psia to about 450 psia and the tobacco which is employed in step (1) has an initial OV content of from about 17 to about 25%.*

*6. The method of expanding tobacco of claim 4 wherein the expansion step is conducted in such a manner that the moisture content of the expanded tobacco obtained from that step is no higher than about 3%.*

*7. In a method of expanding tobacco comprising the steps of (1) impregnating the tobacco with liquid carbon dioxide, (2) subjecting the impregnated tobacco to conditions such that a portion of the liquid carbon dioxide is converted to solid form, and (3) thereafter subjecting the tobacco to conditions such that the tobacco is expanded, the improvement comprising:*

*(a) utilizing as the tobacco which is employed in step (1) a tobacco which has an OV content of from about 17% to about 30%;*

*(b) conducting the liquid contact step under pressure in the range of from about 250 psia to about 450 psia; and*

*(c) conducting the expansion step in such a manner that the moisture content of the expanded tobacco is no higher than about 6%.*

*8. In a method of expanding tobacco comprising the steps of (1) contacting the tobacco with liquid carbon dioxide under conditions such that substantially all of the liquid carbon dioxide is maintained in liquid form and the tobacco is impregnated with liqud carbon dioxide, (2) subjecting the tobacco contacted with liquid carbon dioxide to conditions such that a portion of the liquid carbon dioxide in the tobacco is converted to a solid form, and (3) thereafter subjecting the tobacco to conditions such that the tobacco is expanded, the improvement comprising:*

*(a) utilizing as the tobacco which is employed in step (1) a tobacco which has an OV content of from about 17% to about 30%;*

*(b) conducting the liquid contact step under pressure in the range of from about 250 psia to about 450 psia; and*

*(c) conducting the expansion step in such a manner that the moisture content of the expanded tobacco is no higher than about 6%.*

*9. The method of expanding tobacco of claim 7 wherein the liquid contacting step is conducted at a pressure of from about 350 psia to about 450 psia and the tobacco which is employed in step (1) has an initial ov content of from about 17% to about 25%.*

*10. The method of expanding tobacco of claim 8 wherein the liquid contacting step is conducted at a pressure of from about 350 psia to about 450 psia and the tobacco which is employed in step (1) has an initial ov content of from about 17% to about 25%.*

*11. The method of expanding tobacco of claim 7 wherein the expansion step is conducted in such a manner that the moisture content of the expanded tobacco obtained from that step is no higher than about 3%.*

*12. The method of expanding tobacco of claim 8 wherein the expansion step is conducted in such a manner that the moisture content of the expanded tobacco obtained from that step is no higher than about 3%.*

* * * * *